United States Patent [19]

Weiss

[11] 4,116,541

[45] Sep. 26, 1978

[54] PARABOLIC REFLECTOR WITH VARY TRANSVERSE WIDTH

[76] Inventor: Daniel Weiss, 239 Normandy Rd., Massapequa, N.Y. 11758

[21] Appl. No.: 815,182

[22] Filed: Jul. 13, 1977

[51] Int. Cl.$^2$ .............................................. G02B 5/10
[52] U.S. Cl. .................................. 350/296; 350/299; 350/320
[58] Field of Search ............... 350/296, 295, 292, 293, 350/299, 320, 321, 98, 99, 288; 126/270, 271; 113/116 J; 72/335, 379; 240/103 B

[56] References Cited

U.S. PATENT DOCUMENTS

| | | | |
|---|---|---|---|
| 2,437,677 | 3/1948 | Brown | 350/296 |
| 3,588,492 | 6/1971 | Pollock | 240/103 B |

Primary Examiner—Jon W. Henry
Attorney, Agent, or Firm—Edward H. Loveman

[57] ABSTRACT

A parabolic reflector is made of sheet material from a flat pliable elongated blank bent to form a parabolically curved shield shaped member. Both blank and member have continuously varying transverse widths from end to end thereof and terminate in a pointed lobe at one end or in two pointed lobes at opposite ends. Opposite lateral edges of the blank and member are oppositely curved. The blank and member are symmetrical on opposite sides of a central longitudinal line. The member is parabolically curved longitudinally from end to end and is straight transversely from end to end. The member can be formed by applying a force to the pointed end of single lobed blank while clamping the other end, or by applying equal forces to the pointed ends of a double lobed member. A plurality of parabolically curved members may be disposed side-by-side to increase the area of reflection. A plurality of double lobed members may be attached together at their centers and spread angularly apart to define a parabolic bowl.

9 Claims, 12 Drawing Figures

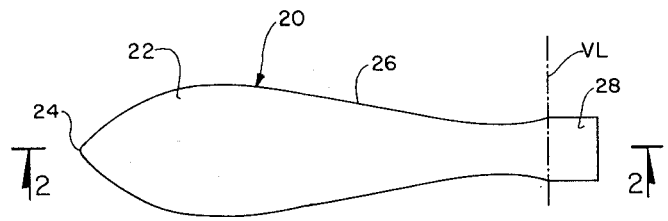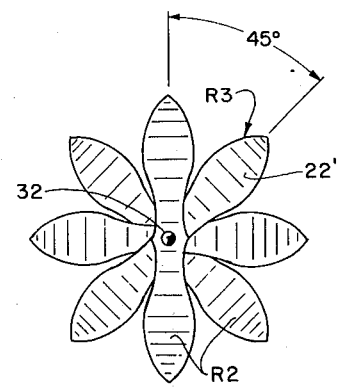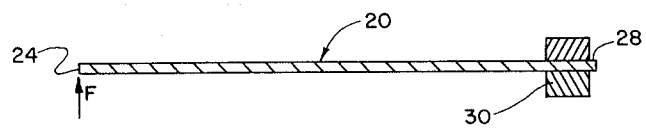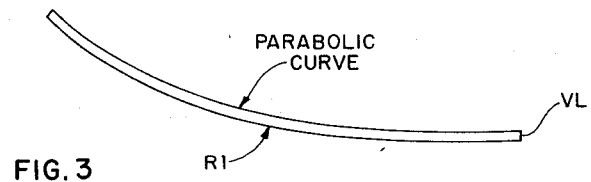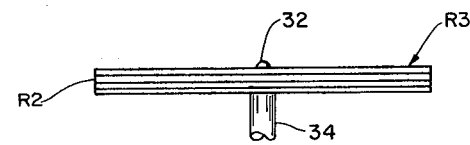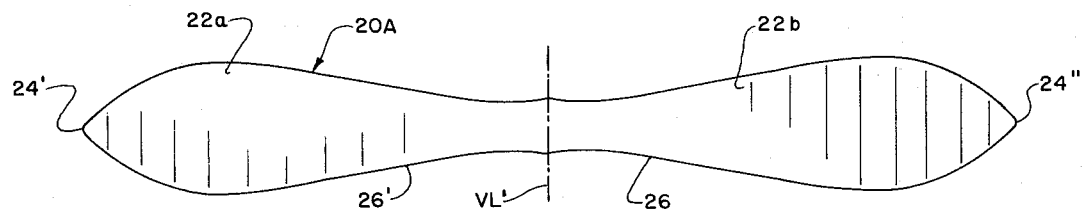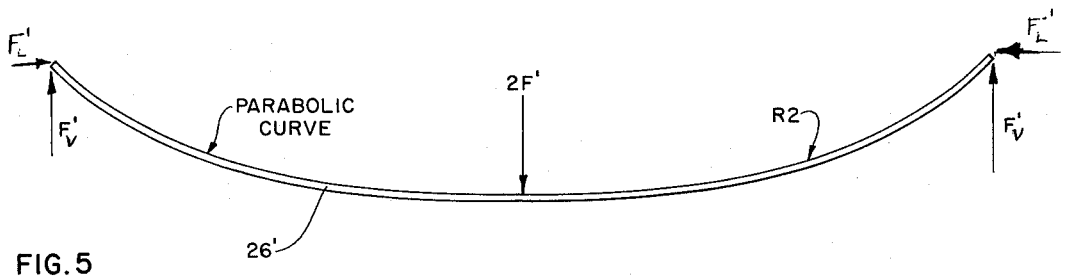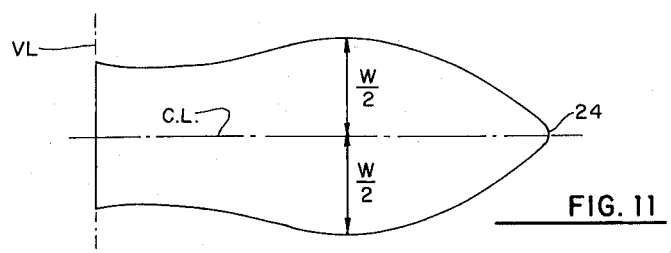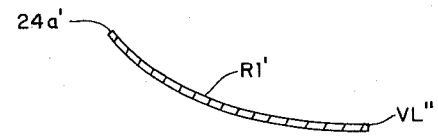

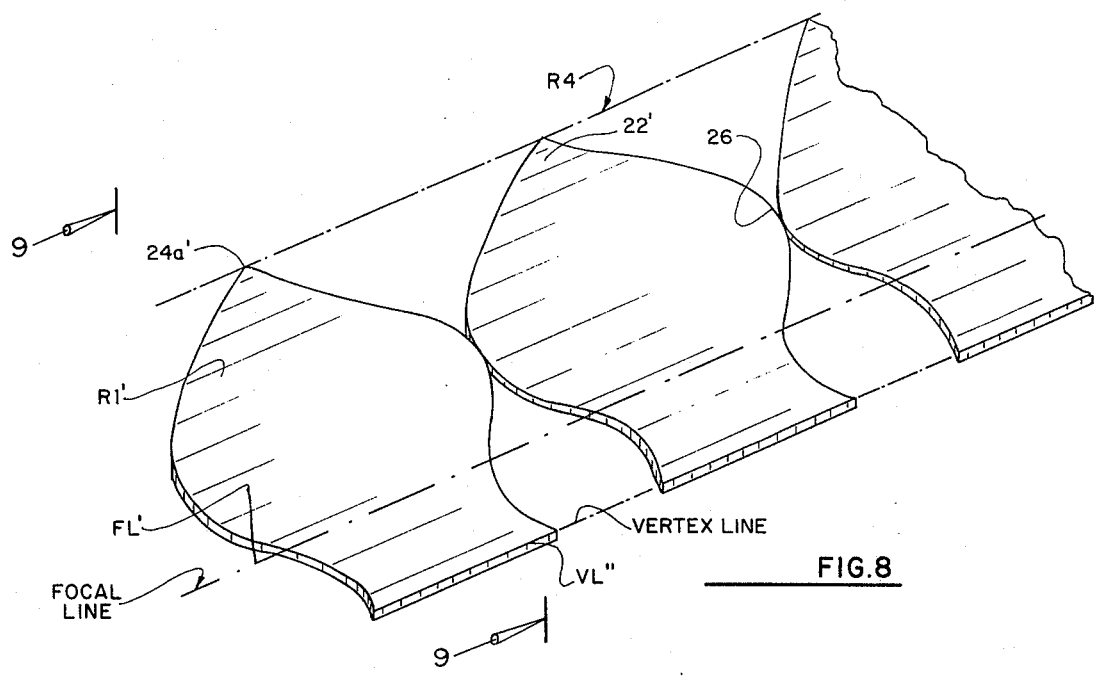
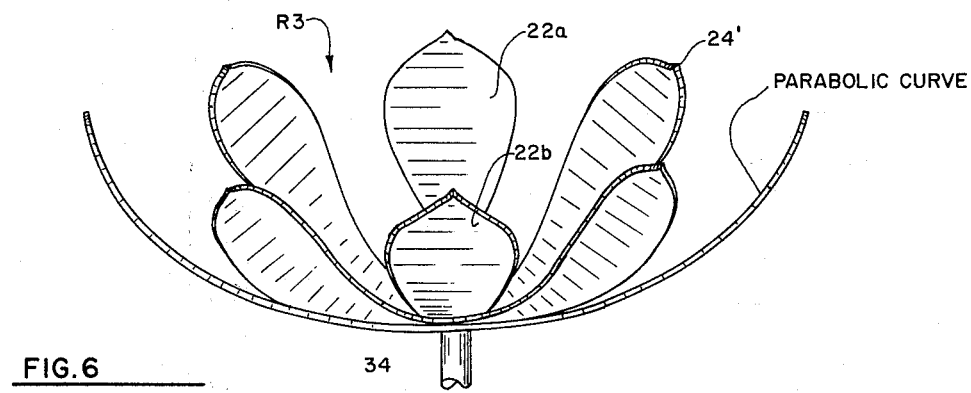

PARABOLIC REFLECTOR WITH VARY TRANSVERSE WIDTH

This invention concerns a novel parabolic reflector and a new method of making such reflectors.

Parabolic reflectors made according to the invention are useful for collecting and concentrating energy from a source to a focal point or focal line of the reflector such as direct solar energy onto heat absorbing or electric generating cells located at the foci of the reflectors. The invention may also be applied to the formation or fabrication of parabolic reflectors used for other purposes such as sound, lighting or microwave reflection. The invention makes it possible to form a parabolic reflector at the site of use. Thus it can be used for space satellite applications portable solar cook stoves and water heaters, and portable solar electric generators. The invention also makes possible low cost fabrication of very large parabolic reflectors for power plant use.

According to the invention a pliable flat sheet or plate of uniform thickness having a prescribed peripheral shape is bent in a certain way to parabolic form. The principle used is that of a simple or cantilevered beam, whose width varies along the length of the beam, so that when forces are applied at certain points, the beam assumes the shape of a portion of a parabolic of predetermined focal length. The parabolic member is symmetrical on both sides of a central longitudinal line from end to end.

It is therefore a principal object of the present invention to provide a reflector made of pliable sheet material and having the shape of a parabolic shell formed from a shield shaped blank of said material, the reflector having a parabolic curvature longitudinally, and being straight transversely between opposite lateral edges which are oppositely curved from end to end. Another object of the present invention is to provide a reflector as described wherein the blank has two petals or lobes.

Still another object of the present invention is to provide a reflector having a multiplicity of parabolically curved lobes.

These and other objects and many of the attendant advantages of this invention will be readily appreciated as the same becomes better understood by reference to the following detailed description when considered in connection with the accompanying drawings in which:

FIG. 1 is a plan view of a flat blank having a single lobe, from which a parabolic reflector may be made according to the invention;

FIG. 2 is a longitudinal sectional view taken along line 2—2 of FIG. 1;

FIG. 3 is a side elevational view of a parabolic reflector formed from the flat blank of FIGS. 1 and 2;

FIG. 4 is a plan view of a flat blank having two lobes, from which a parabolic reflector may be made according to the invention;

FIG. 5 is a side elevational view of a parabolic reflector formed from the flat blank of FIG. 4;

FIG. 6 is an oblique perspective view of a parabolic reflector assembly having multiple lobes;

FIG. 7 is a reduced top plan view of the reflector assembly of FIG. 6;

FIG. 7A is a side view of the assembly of FIG. 6 in collapsed position;

FIG. 8 is a perspective view of part of a parabolic reflector assembly employing a plurality of individual parabolic reflectors;

FIG. 9 is a longitudinal sectional view taken along line 9—9 of FIG. 8;

FIG. 11 is a graphic diagram including a plan view of the parabolic reflector of FIG. 10.

Figure 10:
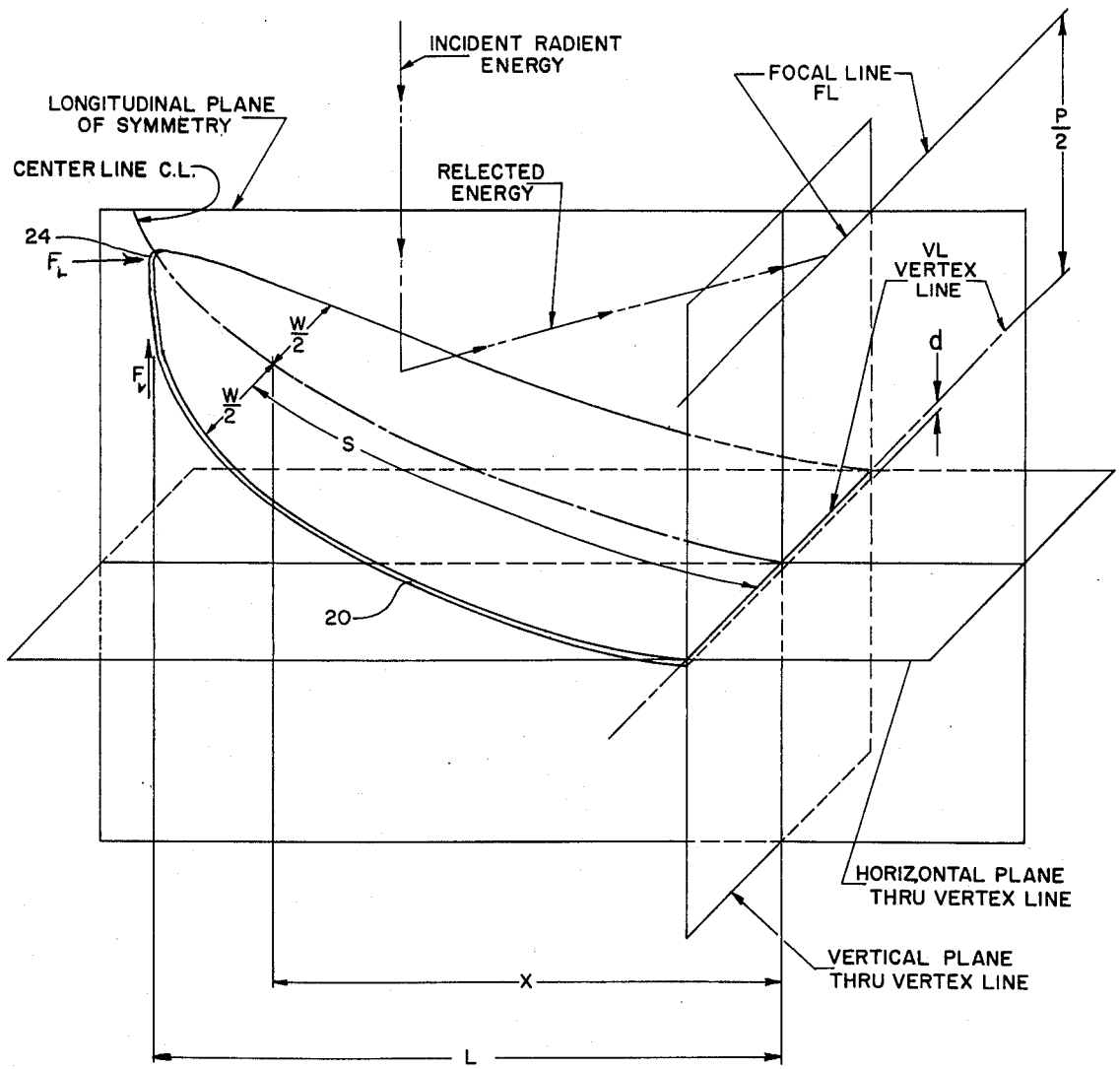
FIG. 10 is a graphic diagram including a side view of a parabolic reflector used in explaining the invention.

Referring now to the drawings wherein like reference characters designate like or corresponding parts throughout, there is illustrated in FIGS. 1 and 2 a flat shield shaped pliable metal blank generally designated by reference numeral 20 having a single lobe 22 and terminating in a tip 24. Lateral edges 26 of the blank 20 are curved in a certain way according to a mathematical formula hereinafter to be explained. The blank 20 has a rectangular end section 28 extending beyond a transverse line VL which will become a vertex end of a parabolic reflector R1 as illustrated in FIG. 3. The reflector R1 is parabolically curved in the longitudinal direction whereas all transverse lines remain straight. The reflector R1 is curved in cantilever fashion by applying a force F to a tip end 24 while the other end 28 is held stationary by a clamping means 30. A conventional parabolic cylinder surface, as illustrated in FIG. 10, comprises a curved surface such that when radiant energy is incident upon the concave reflective side thereof, and the surface is oriented in a specified direction relative to the incident radiation, the radiant energy will be reflected from the point of incidence on the curve surface to a single focal line FL. When the surface is oriented in this manner, the direction of the incident radiation is parallel to a plane joining the focal line FL and the vertex line VL of the parabolic cylinder.

In order for the flat blank 20 to take the parabolic shape upon bending in the manner described, its width variations must conform with the following mathematical formula:

$$w = \frac{6[F_v(L-x) + F_L a (L^2 - x^2)][1.0 + 4a^2 x^2]^{3/2}}{a\, d^3 E}$$

(see Figs. 10 and 11), where:

$w$ = transverse width of the flat blank before and after bending;

$F_v$ = vertical component of force applied at pointed end 24 to form the parabolic shape of the reflector;

$F_L$ = longitudinal component of force applied to said pointed end;

$L$ = projection of the true length of the reflector in a vertical plane perpendicular to vertex line VL of the parabolic reflector after bending from vertex line VL to tip 24;

$x$ = projection of distance s in a vertical plane perpendicular to vertex line VL;

$a = 1/2p$ $p/2$ = distance from focal line FL to vertex line VL;

$d$ = depth or thickness of sheet material of the reflector;

$E$ = modulus of elasticity of the sheet material.

The above formula or equation was derived from the general equation of the elastic curve of a beam. The formula is accurate as long as the elastic limit of the sheet material is not exceeded. The weight of the material is not included in the equation because the effect of the weight of the material on the parabolic shape can be made negligible by designing the reflector to be relatively stiff.

The true distance s along the reflector to any given width w from the line bending begins or vertex line VL is determined from the following equation:

$$s = \frac{x}{2} \sqrt{(1 \neq 4a^2x^2)} \neq \frac{1}{4a} \log_e(2ax \neq \sqrt{1 \neq 4a^2x^2}),$$

where symbols are same as above.

FIG. 4 shows a flat blank 20A having two lobes 22a and 22b terminating in respective free tips 24′, 24″. The two lobes are integrally joined along the vertex line VL′. The parabolic reflector R2 shown in FIG. 5 is formed by applying forces $F_L'$ and $F_v'$ to the tips 24′, 24″ of the blank 20A while counterforce 2F′ is applied along the vertex line VL′. The variable widths of the reflector R2 and shape of the edges 26 and 26′ of the reflector R2 are determined by the same equation as described above.

FIGS. 6 and 7 show a reflector bowl R3 formed by securing a plurality of double reflectors R2 at their centers by a rivet or bolt 32. Each of the reflectors R2 has double lobes 22a, 22b. The double lobed reflectors R2 are shown spaced 45° apart to define an eight-lobed structure. In this array the bowl R3 can be arranged to rotate on a central axial post 34 secured to the base of the bowl R3. For storage purposes, the flexible lobes 22a, 22b may be gathered together like a fan by aligning all reflectors R2 with each other as shown in FIG. 7A. The opened bowl array R3 of FIG. 6 provides increased concentration of radiation onto a small focal area.

FIG. 8 and 9 show another reflector array R4 in which a plurality of parabolic reflectors R1′ each having a single lobe 22′ are disposed in side-by-side arrangement with the edge 26 of each blank 20 in contact with the adjacent edge 26 of the adjacent blank 20, and with all the focal lines FL′, tips 24′a and vertex lines VL″ in respective alignment. Similarly double lobed reflectors R2 as shown in FIG. 5 can be arranged in side-by-side array to increase the amount of wave reflection or wave radiation of the array.

It will now be apparent that each of the reflectors R1, R1′, and R2 comprise one or more shells having one or two lobes and bent so that all longitudinal sections taken in planes parallel to the central longitudinal line of the reflector define indentically curbed parabolas with their foci aligned on a single transverse focal line with respect to the central longitudinal plane of the reflector. All the reflectors with single lobes are formed by applying a force to one end of a flat blank while the other end is held stationary. All reflectors with two lobes are formed by applying equal forces to opposite ends of the reflector while a force equal to twice the force applied to each end is applied to the center of the flat blank from which the reflector is made. The blanks assume a true parabolic curvature when the lateral widths of the reflectors vary in accordance with the equations presented above.

It should be understood that the foregoing relates to only a limited number of preferred embodiments of the invention, which have been by way of example only and that it is intended to cover all changes and modifications of the examples of the invention herein chosen for the purposes of the disclosure, which do not constitute departures from the spirit and scope of the invention.

THE INVENTION CLAIMED IS:

1. A parabolic reflector made of pliable sheet material from a flat shield shaped blank of said material bent to form a curved member, said blank having continuously varying transverse widths from end to end thereof and having a lobe terminating at a point at one end thereof, opposite lateral edges of said blank being oppositely curved from end to end thereof, said blank being symmetrical in form on opposite sides of a central longitudinal line thereof, said member having a parabolic curvature longitudinally from end to end thereof and being straight transversely between opposite lateral edged along the entire length of said member.

2. A parabolic reflector as defined in claim 1, wherein said member is formed by applying a force to said one end of said blank while clamping the other end thereof in cantilever fashion.

3. A parabolic reflector as defined in claim 1, further comprising a plurality of further parabolically curved members each identical in size and shape to the first named member, said members being disposed in side-by-side position to define an array of increased reflection capability.

4. A parabolic reflector as defined in claim 1, wherein the other end of said member is formed with another lobe terminating in another point.

5. A parabolic reflector as defined in claim 4, wherein both lobes of said member are identical in size and shape.

6. A parabolic reflector as defined in claim 4, wherein said member is formed by applying equal forces to opposite ends of said blank in one direction perpendicular thereto while applying another force equal to the sum of said equal forces to the center of said blank in an opposite direction.

7. A parabolic reflector as defined in claim 4, further comprising a plurality of further parabolically curved double lobed members each identical in size and shape to the first named member, and means securing all of said members to each other at registering centers thereof, whereby all of said members may be disposed angularly to each other to define a parabolic bowl.

8. A parabolic reflector as defined in claim 2, wherein said member is bent to said parabolic shape by applying a force to each end of said blank, and wherein said varying widths of said member conform to the equation:

$$w = \frac{6[F_v(L-x) + F_L a(L^2 - x^2)][1.0 + 4a^2x^2]^{3/2}}{a\, d^3 E}, \text{ where}$$

w = to varying transverse widths of said blank from one end to the other end:

$F_v$ = the vertical component of force applied at each end of said blank to form said parabolic shape;

$F_L$ = the longitudinal component of force at each end of said blank to form said parabolic shape;

L = the projection of the true length of said member in a vertical plane;

s = the true distance along said curved member from said other end thereof to any transverse width w;

x = the projection of distance s on said vertical plane;

a = ½p p/2 = distance from line where incident energy is reflected to line of bend;

d = the thickness of said blank; and

E = modulus of elasticity of said sheet material.

9. A parabolic reflector as defined in claim 8, wherein distance s can be defined by the equation:

$$s = \frac{x}{2}(1 \neq 4a^2x^2) \neq \frac{1}{4a}\log_e(2\,ax \neq 1 + 4a^2x^2).$$

* * * * *

UNITED STATES PATENT AND TRADEMARK OFFICE
CERTIFICATE OF CORRECTION

PATENT NO. : 4,116,541
DATED : September 26, 1978
INVENTOR(S) : DANIEL WEISS

It is certified that error appears in the above-identified patent and that said Letters Patent are hereby corrected as shown below:

In Column 1, Line 27, change "parabolic" to --parabola--. Column 3, Lines, 6-9, the formula should read as follows:

$$s = \frac{x}{2}\sqrt{(1 + 4a^2x^2)} + \frac{1}{4a} \text{Log}_e (2ax + \sqrt{1 + 4a^2x^2});$$

Line 47, change "indentically curbed" to --identically curved--. Column 4, Line 7, change "edged" to --edges--; Line 57, change "on" to --in--; Line 59, before "where" insert --to--; the formula in Claim 9 should appear as follows:

$$s = \frac{x}{2}\sqrt{(1 + 4a^2x^2)} + \frac{1}{4a} \text{Log}_e (2ax + \sqrt{1 + 4a^2x^2}).$$

Signed and Sealed this

Nineteenth Day of June 1979

[SEAL]

Attest:

RUTH C. MASON
Attesting Officer

DONALD W. BANNER
Commissioner of Patents and Trademarks